Figure 1:
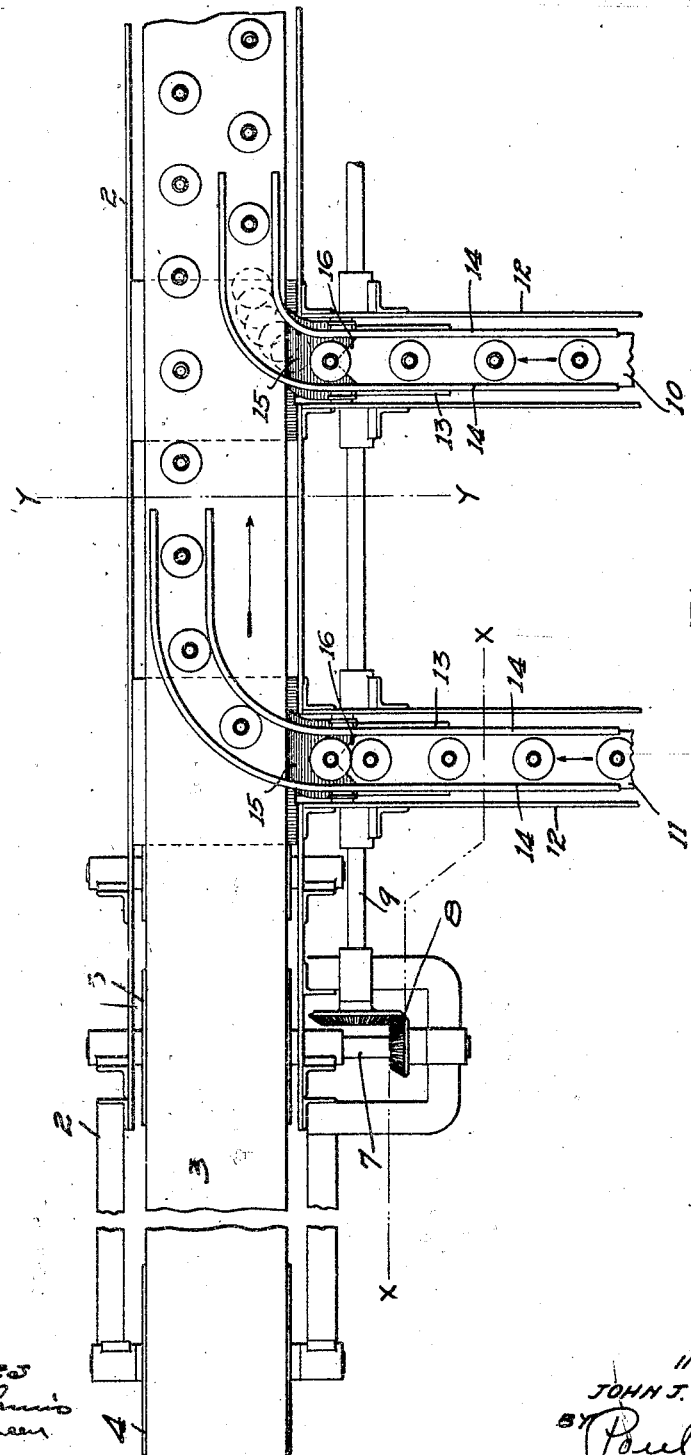

J. J. FRIEL.
CONVEYER.
APPLICATION FILED NOV. 5, 1913.

1,109,284.

Patented Sept. 1, 1914.
2 SHEETS—SHEET 1.

WITNESSES

INVENTOR
JOHN J. FRIEL
BY
ATTORNEYS

J. FRIEL.
CONVEYER.
APPLICATION FILED NOV. 5, 1913.
1,109,284.
Patented Sept. 1, 1914.
2 SHEETS—SHEET 2.
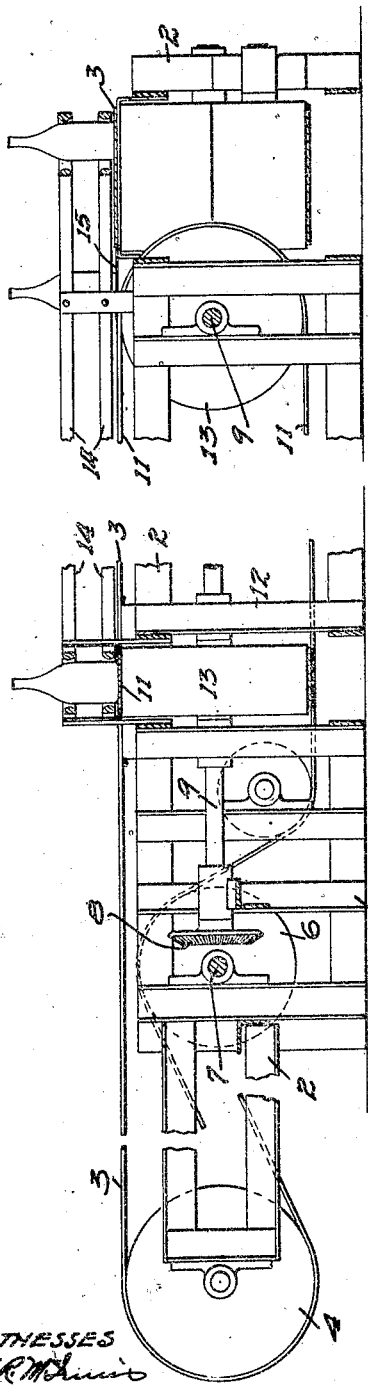
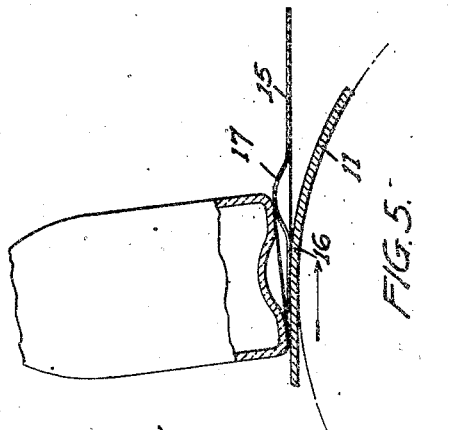
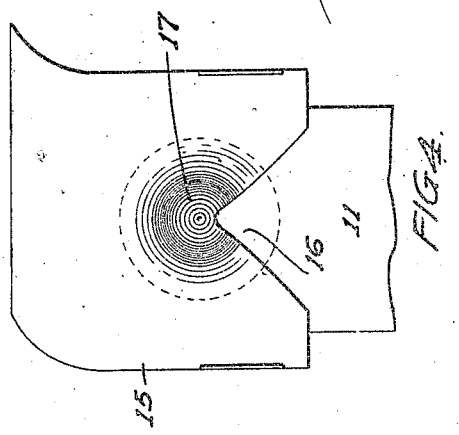
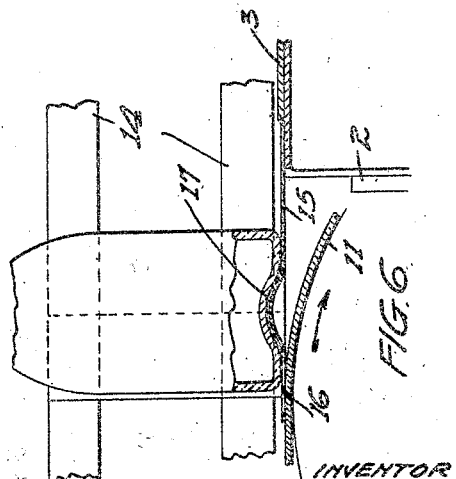
INVENTOR
JOHN J. FRIEL
BY
ATTORNEYS

UNITED STATES PATENT OFFICE.

JOHN J. FRIEL, OF ELLWOOD CITY, PENNSYLVANIA, ASSIGNOR TO MATHEWS GRAVITY CARRIER COMPANY, OF ELLWOOD CITY, PENNSYLVANIA, A CORPORATION.

CONVEYER.

1,109,284.      Specification of Letters Patent.      Patented Sept. 1, 1914.

Application filed November 5, 1913. Serial No. 799,305.

*To all whom it may concern:*

Be it known that I, JOHN J. FRIEL, a citizen of the United States, resident of Ellwood City, county of Lawrence, State of Pennsylvania, have invented certain new and useful Improvements in Conveyers, of which the following is a specification.

My invention relates to conveyers or corriers for transporting articles, such as bottles, in an upright position from place to place.

In delivering bottles from a cross conveyer to the main conveyer, great difficulty has been experienced in keeping the bottles upright. If one bottle tips, it obviously interrupts the whole line and necessitates the attention of the operator to place the bottles which may topple over in an upright position.

The object, therefore, of my invention is to provide means for maintaining the bottles in an upright stable position as they are delivered from one belt to another.

The invention consists generally in the constructions and combinations hereinafter described and particularly pointed out in the claims.

In the accompanying drawings forming part of this specification, Figure 1 is a plan view of a conveyer with my invention embodied therein, Fig. 2 is a vertical sectional view on the line x—x of Fig. 1, Fig. 3 is a sectional view on the line y—y of Fig. 1, Fig. 4 is a plan view of a portion of a cross conveyer, and the deflector plate showing my invention, Fig. 5 is a detail sectional view, showing a bottle in the act of passing from the conveyer belt upon the deflector plate, Fig. 6 is a similar view, showing the bottle seated on the deflector plate in position to be discharged therefrom by contact with the succeeding bottle.

In the drawing, 2 represents a suitable frame and 3 a portion of the main conveyer belt operating over a suitable pulley 4.

6 is an idle friction pulley having a shaft 7 that is geared at 8 to a drive shaft 9 operated from a suitable source of power.

10 and 11 represent cross conveyers having frames 12 and pulleys 13 mounted on the drive shaft 9 and operating simultaneously with the main conveyer belt. Guides 14 are provided for directing the articles coming in over the cross conveyers upon the main conveyer on each side of the longitudinal center thereof, as shown in Fig. 1. In the interval or gap between the edge of the main conveyer and the point where the cross conveyers pass out of engagement with the articles thereon, a deflector plate 15 is provided, the bottles or other articles being fed by the cross conveyers upon the deflector plate and each bottle being pushed ahead of the succeeding bottle over this deflector plate upon the main conveyer. It has been found, however, that there is a tendency for the bottles to topple over while sliding over the deflector plate, due probably to the fact that the contact of the base of the bottle with the stationary plate tends to arrest or check the bottle, while the momentum of the upper portion of the bottle carries it forward until the force of gravity retaining the bottle in its upright position is overcome. To obviate this objection and avoid the expense of having an operator watch the delivery of the bottles, and the loss of time incidental to the stoppage of the carrier, I provide a recess 16, preferably V-shaped, in the outer edge of the plate and at the apex of this recess I press up or otherwise form a hump or projection 17 having a rounded surface over which the bottles will slide easily. This hump is made to correspond substantially with the recess usually found in the bottom of a bottle, particularly beer bottles and the like, and when the bottle has passed onto the plate and before it is out of engagement with the cross conveyer, its forward portion will be raised, tilting the bottle backwardly and checking its momentum. This hump is not sufficiently high to cause the bottle to topple backward, but is just high enough to counteract the momentum of the bottle and prevent it from wabbling or toppling when discharged from the cross conveyer. As the next bottle comes along, it will contact with the forward one seated on the hump and push it forward over the plate until finally it is discharged upon the main conveyer between the guides 14. When the first bottle is displaced by the succeeding one on the hump, the main belt will draw the first bottle automatically onto the belt, owing to the fact that the main belt is a little higher than the plate, and also because the guard curves extend in substantially the same direction as the travel of the main belt.

I have illustrated two cross conveyers delivering to the main conveyer, but it will be understood that there may be any number of these, the main conveyer, of course, being of proper width to accommodate the bottles in rows as they are discharged from the cross conveyer. The guides extending from the main conveyer operate to arrange the bottles in rows which will move along independently of one another to their destination.

In the operation of the device, the first bottle will be displaced from the hump by the succeeding one, each bottle moving the next preceding one and displacing it and feeding it forward on the plate to be engaged by the main conveyer.

In various ways the details of construction herein shown and described may be modified and still be within the scope of my invention.

I claim as my invention:—

1. The combination, with a main conveyer and a cross conveyer for delivering articles to said main conveyer, of a deflector or guiding device arranged to bridge the gap between said conveyers, and means for tilting backwardly the articles passing upon said bridging means and overcoming the momentum thereof.

2. The combination, with a main conveyer, of a cross conveyer, a deflector plate arranged to bridge the gap between said conveyers and over which plate the articles are pushed, those in front being fed forward by contact of the articles in the rear, said plate having means for tilting each article backwardly to check the momentum thereof and prevent its toppling over.

3. The combination, with a main conveyer, of a cross conveyer, means bridging the gap between said conveyers and over which bridging means the articles are fed, the forward ones by the contact of those in the rear, said bridging means having a hump thereon arranged in the path of the articles moving thereover, for the purpose specified.

4. The combination, with a main conveyer belt, of a cross conveyer arranged to deliver bottles in an upright position to said main conveyer, a bridging means interposed between said conveyer, said bridging means having a V-shaped recess in its edge adjacent to said cross conveyer, and a hump formed thereon contiguous to the apex of said recess and over which hump the bottles are fed by said cross conveyer.

5. The combination, with a main conveyer, of cross conveyers, means bridging the gap between said main conveyer and cross conveyers and over which bridging means the articles are fed from said cross conveyers to said main conveyer, and curved guides overhanging said main conveyer and arranged to guide the articles in distinct rows upon said main conveyer parallel, substantially, with the edges thereof.

In witness whereof, I have hereunto set my hand this 22nd day of October, 1913.

JOHN J. FRIEL.

Witnesses:
   Jos. W. Humphrey,
   H. J. Buck.